June 24, 1958  R. H. ABBOTT ET AL  2,840,364
EXPANSIBLE SKEWBACK BUCK STAY BANDS
Filed April 21, 1954

INVENTORS
Robert H. Abbott
George M. Meisel
BY
ATTORNEY

United States Patent Office 2,840,364
Patented June 24, 1958

2,840,364

EXPANSIBLE SKEWBACK BUCK STAY BANDS

Robert H. Abbott, Lakewood, and George M. Meisel, Denver, Colo.

Application April 21, 1954, Serial No. 424,576

1 Claim. (Cl. 263—26)

This invention relates to supports for refractory arches in vertical, circular ore roasting ovens, and more particularly to expansible buck stay bands for supporting a skewback ring to provide for expansion of refractory arches in vertical, circular ore roasting ovens.

Circular ore roasters, for example Skinner or similar type ovens, comprise a number of hearths superimposed in vertical alignment. This vertical construction provides for economy of construction, economy of heating, economy of floor space, etc., and is currently a popular type ore roasting oven. The hearths are placed one above each other, and may include a combustion chamber above each hearth immediately beneath the next highest hearth. The combustion chamber is provided between the radiating arch and the hearth above to prevent direct flame contact with the ore being processed. Each hearth includes two or more rakes for stirring and moving the ore being roasted, and a central shaft is supplied for rotating the rakes within the furnace. A central hole or several peripheral holes are alternately provided for each hearth as ore drop holes and for exhausting the gases and fumes emitting from the roasting process. Such furnaces are constructed of refractory material since the temperatures of ore roasting processes are quite high.

The ore roasting furnaces are first completely built, and they are then slowly heated to roasting temperatures so that all the parts of the furnace become thoroughly heated and reach equilibrium temperature. On heating, of course, the refractory material expands as does any material, but such expansion is provided for in the design of the roaster, or it is compensated for by the expansion of adjoining parts. Metal, on one hand, expands on heating a certain amount and then remains substantially constant as long as the particular temperature remains constant. Refractory, on the inside of the furnace may under certain chemical reactions continue to expand at constant temperatures of operation. The slow but continuous expansion of the refractory furnace arches is greatest along the diameter of the furnace, since the major length of refractory material is along this dimension. The thickness of the arches is relatively small, especially when considered with the furnace diameter. The upper and lower surfaces of the arches are substantially uninhibited so that expansion along the thickness dimension is not detrimental. The arches are supported on the outer edge by resting on skewback rings, which are built as an integral part of the furnace exterior walls. The radiating arch and its superimposed hearth are joined together on the inner edge thereof, forming a central ore drop and gas exhaust opening. The enclosed space between the hearth and the radiating arch provides a closed combustion chamber therebetween. The arches in the furnace are exposed to heat on substantially all major surfaces, whereas the supporting skewbacks and other vertical wall sections are only exposed on minor surfaces inside the furnace. While the arches slowly expand along their diameter, the skewback rings remain relatively constant after reaching operating heat. This expansion of the arches will attempt to force the skewback ring out of position in the furnace wall, but as in the usual procedure the skewback ring is fixed in place, the arches destroy themselves by the expansion.

According to the present invention, means are provided to flexibly support skewback rings of a vertical ore roasting furnace with an expansible buck stay band, which will permit expansion of the skewback ring to accommodate the expansion of the arches of the furnace. The buck stay band includes a sectioned metal band, which sections are flexibly secured together by stud bolts under spring tension. The amount of actual movement is relatively small, but it is a powerful force. Springs are used to secure the skewback rings in position and thereby hold the arches and permit expansion of the skewback rings as the arches expand.

Included among the objects and advantages of the present invention is a flexible support for a skewback ring of a vertical ore roaster. The support permits continuing expansion of refractory arches in such furnaces without detrimental effects thereto. The supports, or buck stay bands, provide an adjustable, flexible support for expanding refractory arches.

These and other objects and advantages will be readily apparent by referring to the following description and illustrations in which.

Figure 1:
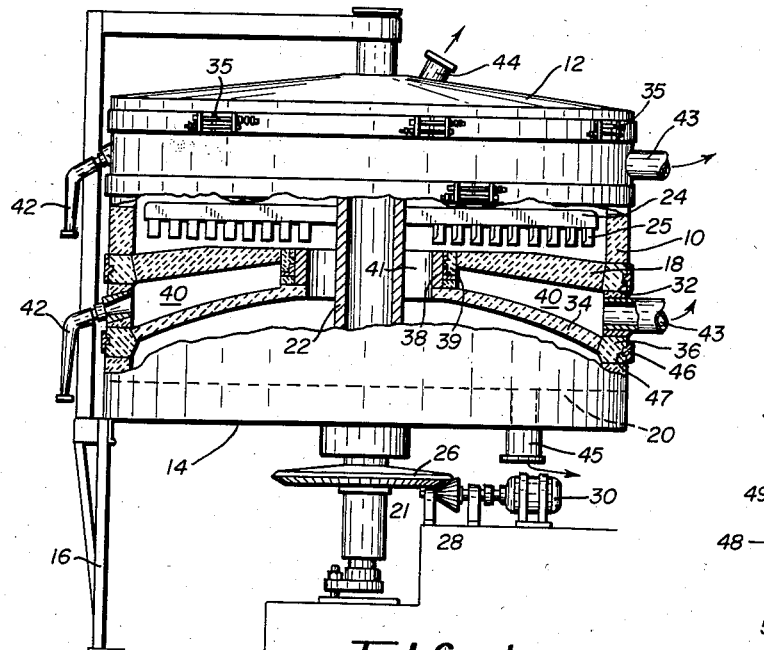
Figure 1 is an elevation, in partial section, of a vertical ore roaster showing the positions of the buck stay band in operational position.

The furnace illustrated in Figure 1 shows in general the construction of a two hearth vertical ore roaster. The roaster comprises, in general, a cylindrical refractory wall 10 having a top 12 and a bottom 14 defining the shell of the roaster. The assembly is supported on a plurality of spaced legs 16 maintaining a sufficient height to provide for the drive thereunder. For commercial operations, the roasters are of substantial size, for example, a 15 foot diameter by about 9 feet high two hearth furnace is a common size, but larger sizes are in use. An upper hearth 18 and a lower hearth 20, the lower hearth is also the floor of the roaster, are provided to hold finely divided ore during the roasting process. A central shaft 22 having a plurality of rabble arms or rakes 24 extended above each hearth is provided for stirring and moving the ore during the process. The rakes include rabble teeth 25 extending downwardly to within a short distance above the hearth. To drive the central shaft a bevel gear or spur gear 26 is driven by a bevel pinion or spur pinion 28 interconnected with a gear reducer 30. The upper hearth 18 is a centrally apertured refractory disk which seats against a skewback ring 32, which is a part of the vertical wall 10. Immediately below the hearth 18 is a radiating arch 34 which is likewise constructed of refractory material and is a centrally apertured disk. The radiating arch 34 seats against another skewback ring 36, which is, also, an integral part of the wall 10. The inner ends of the hearth and the radiating arch are joined to a muffle seal consisting of two refractory rings 38 and 39 to form a completely closed muffle or combustion chamber 40. The muffle is an annular space between the radiating arch and the hearth and is provided with burners 42 and an outlet 43 for exhausting the spent hot gases. The ring 38 provides a central opening 41 surrounding the shaft 22 so that gases which are emitted during the roasting process may pass upwardly and subsequently out of the roaster by means of outlet 44. The opening 41 also provides an outlet for ore from the upper hearth by dropping onto the lower hearth. The ore is moved by the rabbling mechanism which slowly revolves inside the furnace. Ore is fed onto the upper hearth where it is gradually raked onto the lower hearth and subsequently out through a coke outlet 45 through the bottom hearth 20.

As it is virtually impossible to construct a one piece refractory shell or wall for such a large furnace, the wall is made of multiple pieces or bricks. In general, such a wall is not only sectioned vertically but it is sectioned horizontally. This means that instead of making a 15 foot diameter skewback ring, for example, the skewback ring is built of small blocks or bricks the width of the skewback ring and only a few inches long. The individual shapes are then cemented together to form a continuous ring. The arches in the furnace are also a multiple shape refractory structure of sufficient strength to hold up inside the furnace, held together by buck stay bands of metal covering the outside. For the purpose of differential expansion, individual bands around each ring section of the wall are preferable.

Figure 2:
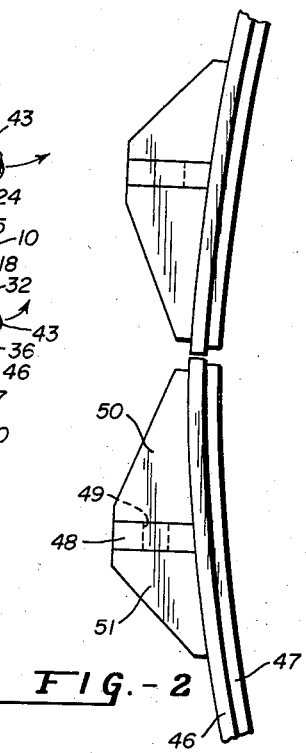
Figure 2 is a detail plan view of the load plates and ribs of the spring arrangement according to the invention.
Figure 3:
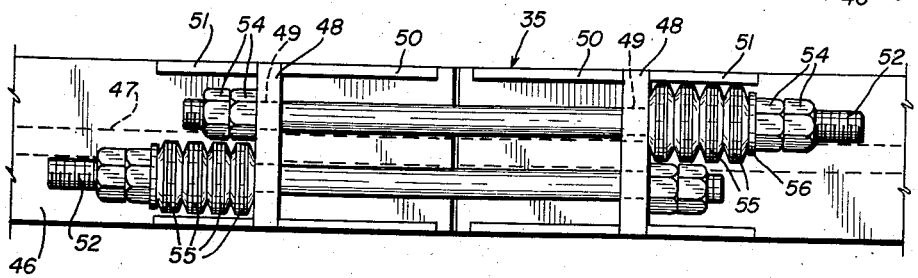
Figure 3 is a front elevation showing the spring arrangement according to the invention.

The buck stay band, Figs. 2 and 3, comprises a rectangular metal band 46, which is substantially wider than it is thick, and welded on the inside of the band is a small skewback positioning bar 47. The band encircles the skewback ring, and the inner bar 47 fits in a groove in the brick to hold the same in position around the particular ring. The band 46 is generally a sectioned band, having six or seven sections, or more, depending on the size of the roaster.

The sections of the band 46 are connected together by means of spring arrangement 35. The spring arrangements include at each end of a section of the band a load plate 48 welded thereto. The load plate is supported by means of a front rib 50 and rear rib 51 welded to the load plate and to the band. The ribs or gusset plates transmit the tangential loads to the load plate. Two load plates are joined together by means of a stud 52 which passes through a hole 49 in each load plate.

The load to which a band will be subjected determines the number of studs required to hold the sections of the band together. The buck stay shown in Figure 3 illustrates the use of two studs, under spring load, which is the normal requirement to hold a skewback ring supporting the heavier cone arch of the hearth. A single stud buck stay, shown in Figure 4, is all that is normally required to support the skewback ring holding the lighter radiating dome arch.

The stud 52 is threaded at both ends, and a spring is placed on one end of the stud. In Figure 3, the stud 52 passes through holes 49 in the load plate and is secured at one end by a pair of nuts 54. The opposite end of the stud has a spring on the stud in front of a washer 56, and the assembly is completed by a pair of nuts 54. The Belleville spring shown in Figures 3 and 4 is composed of a number of dished washers which are placed in series and in parallel to provide as much spring action as is required. In the springs shown, each spring section comprises a pair of conical washers in parallel opposing in series an oppositely directed pair of parallel conical washers. The distance of travel on compression of a section of the Belleville spring is determined as twice the dish of the particular washers. One cup is normally in series with an opposing cup, regardless of the number of washers in parallel. In the case of Figure 3 the distance of travel of compression of the spring is four times the individual spring segment, or eight times the distance required to flatten one washer.

Figure 4:
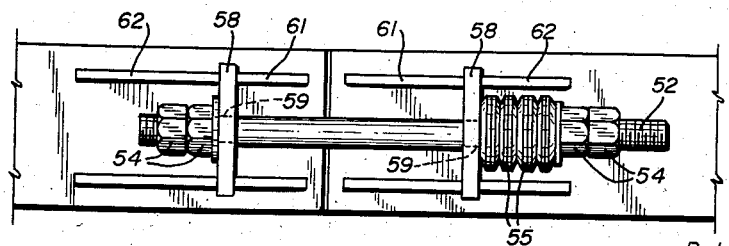
Figure 4 is a modified spring arrangement according to the present invention.

The buck stay illustrated in Figure 4 comprises a pair of load plates 58 having a single hole 59 centerwise thereof. The load plates are supported by means of a forward rib 61 and a rear rib 62 and carry a stud 52 therebetween. As in the prior case a pair of nuts 54 holds the stud at one end and a pair of nuts abutting a spring 55 secures the other end.

The sectioned buck stay band may be periodically adjusted to accommodate the particular state of expansion of the arches in the furnace. The spring arrangements, however, give flexible support to the buck stay band which is indirectly supporting the heavy refractory arches in the furnace. The arrangement permits expansion of the skewback ring as the arches of the roaster expand under the continuous heat of the process. Since such furnaces must be operated on a twenty-four hour, seven day a week basis, proper flexible support, such as is provided by the spring loaded buck stay bands of the present invention, prevents damage and destruction of the furnace.

While a particular type of buck stay band has been illustrated, it is obvious that other types may be utilized without departing from the spirit of the invention. Other types of springs may obviously be used in place of the Belleville springs to provide support and also an expansion in the support of the refractory arches of such roasters. There is no intent to limit the invention to the precise details illustrated except insofar as defined by the appended claim.

We claim:

An expansible support for a refractory arch in a vertical Skinner or similar cylindrical-type ore roaster which comprises a multi-sectioned buckstay band arranged to encircle a skewback ring supporting a refractory arch, said buckstay band including a plurality of curved metal band sections each having its width aligned with the axis of the roaster and a supporting member of substantially smaller width securely mounted on the concave side of each band section for engaging a mating surface in the skewback ring on which it is mounted, and joiners interconnected to the ends of each section and arranged to join the sections into a continuous expansible ring, said joiners including a pair of upright gusset plates mounted on each end of each section, said gusset plates being symmetrically opposed to each other on each end and extending lengthwise of said band, a lateral load carrying cross member secured between each set of gusset plates and spaced from the end of the band section, at least one adjusting tie member mounted through the cross members of adjoining band ends, spring tension means mounted on said tie member arranged to hold adjoining band ends under spring tension, and adjusting means mounted on each said tie member for securing said tie member in said cross members.

References Cited in the file of this patent

UNITED STATES PATENTS

| | | |
|---|---|---|
| 1,355,115 | Cook et al. | Oct. 5, 1920 |
| 2,101,786 | Wise | Dec. 7, 1937 |
| 2,206,679 | Siebert | July 2, 1940 |
| 2,550,078 | McDonald | Apr. 24, 1951 |

FOREIGN PATENTS

| | | |
|---|---|---|
| 833,325 | France | Oct. 19, 1938 |